April 19, 1955 H. N. ARNOLD 2,706,363
RODENT EXTERMINATING METHOD
Filed Feb. 11, 1954 2 Sheets-Sheet 1

Inventor
Henry N. Arnold
by Roberts, Cushman + Grover
Att'ys.

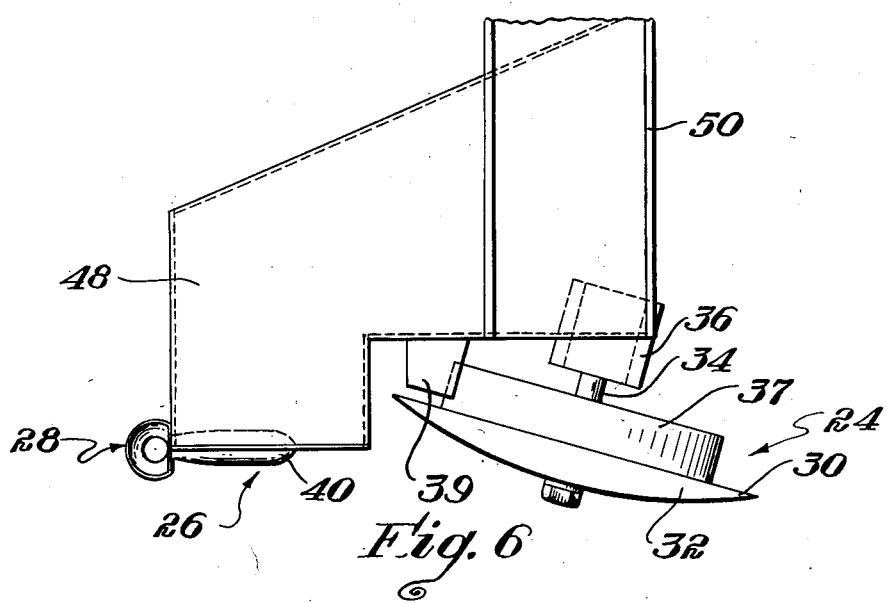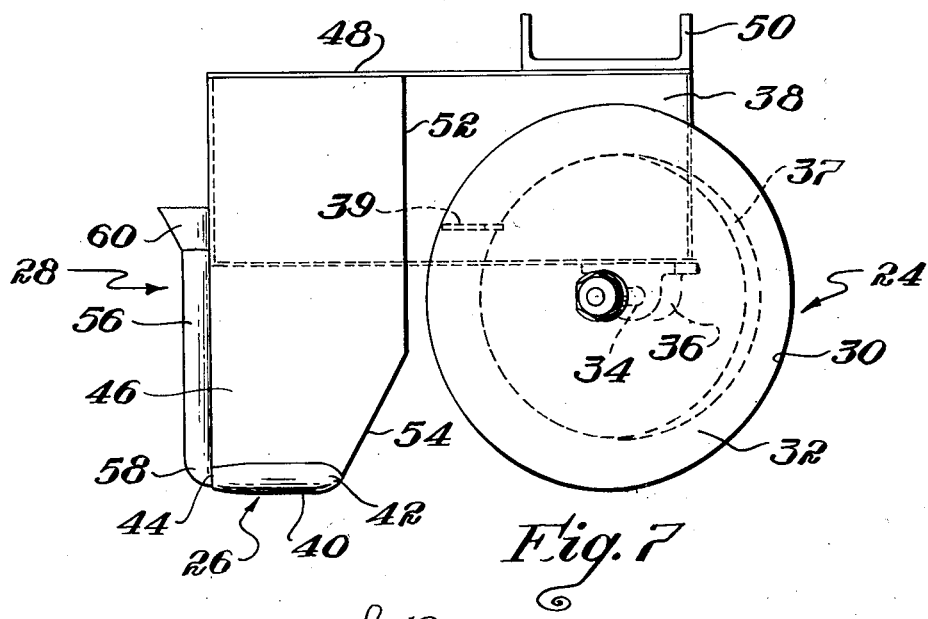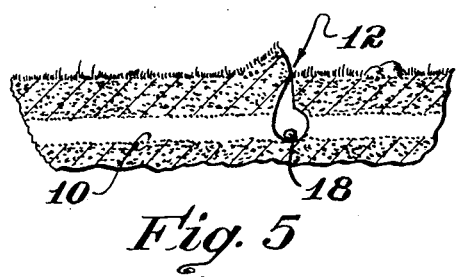

United States Patent Office 2,706,363
Patented Apr. 19, 1955

2,706,363

RODENT EXTERMINATING METHOD

Henry N. Arnold, Greene, R. I.

Original application October 19, 1953, Serial No. 386,940. Divided and this application February 11, 1954, Serial No. 409,650

5 Claims.  (Cl. 43—124)

This invention relates to the care of orchards and more especially to a method of exterminating burrowing rodents which attack the roots of trees beneath the ground and is a division of my pending application Serial No. 386,940, filed October 19, 1953.

A great deal of havoc is caused in orchards by burrowing rodents who eat the buried unexposed roots of the trees. These animals make numerous tunnels or runways in the sod which they use habitually to reach the roots of the trees. The root tips seem to be preferred hence the tunnels which are usually evidenced by faint depressions in the sod generally encircle each tree in a more or less circle path just beneath the outstretched extremities of the branches of the trees which in general correspond to the root spread. Such tunnels are, of course, devious in their course and have many branches, some of which run laterally off to join the tunnels encircling adjacent trees.

It has been suggested that furrows could be made in the sod so as to intersect some of the tunnels in the vicinity of the trees and to place poisoned bait therein. This, however, is dangerous to domestic animals who may also be attracted to the bait and as a matter of fact is in many States contra to the law which prohibits placing poisoned bait in exposed places where it may be encountered by domestic animals or by harmless wild animals. Furthermore, the rodents are timid and not likely to expose themselves in an open furrow except in case of extreme hunger. It was then proposed to construct a covered trench and the method and apparatus for this purpose is the subject matter of my copending application for patent Serial No. 329,695, filed January 5, 1953, now abandoned.

The principal objects of this invention is to provide an improved method for constructing burrows or passages without sacrificing any of the advantageous characteristics of the method and apparatus disclosed in the aforesaid copending application Serial No. 329,695, filed January 5, 1953.

The method involves making a continuous cut in the sod along the row of trees just under their outstretched branches, tilting the incised sod along one side of the cut, preferably at the outside of the cut with respect to the trees, to turn it upwardly thereby to open a furrow or trench and while the sod is held elevated, compacting the bottom of the trench so as to make it smooth, dropping pieces of bait along the bottom of the trench as it is packed smooth and then permitting the elevated sod to fall back so as to cover the trench leaving a continuous unobstructed passage which intersects one or more rodent-made tunnels and in which there are distributed pieces of bait for attracting the rodents from their usual habitat. During elevation of the sod and prior to compacting the bottom the underside of the sod is operated upon to loosen some of the soil clinging to the sod roots so that it falls into the trench and is packed down when the bottom of the trench is compacted. Simultaneously, the sod is stretched or unattenuated to some extent so that when it falls back the lower part of its free edge portion lies contiguous to the upper part of the opposite edge portion of the trench thereby preventing the sod from collapsing into the passage and hence blocking it.

The invention will now be described with reference to the accompanying drawings wherein:

Fig. 5 is a vertical section showing the completed passage with bait deposited therein and covered at the top;

Fig. 6 is a plan view of the apparatus for making the trench;

Fig. 7 is a side elevation of the apparatus; and

Figure 2:
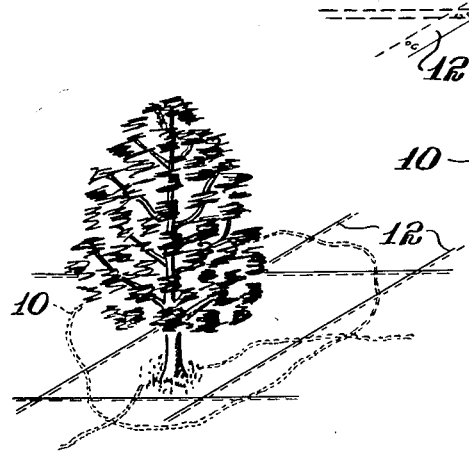
Fig. 2 is an isometric view of an orchard tree showing the ground therebeneath, the approximate location of rodent-made tunnels about the tree and the location of the covered passages as made herein intersecting the rodent tunnels.

Referring to Fig. 2, there is shown an orchard tree beneath which there is a rodent-made tunnel 10 shown in dotted lines, which runs in a generally circular fashion about the base of the tree at a radius which corresponds roughly to the locus of the tips of the branches which in turn corresponds roughly to the locus of the tips of the roots beneath the ground. While the rodent tunnel is shown in generally circular form it, of course, deviates very greatly from a true circle and may have numerous branches which run toward the trunk of the tree and/or radially outward across the aisle to the base of an adjacent tree. Since the rodent-made tunnels are most apt to be concentrated, as pointed out, at the tips of the roots just beneath the outer extremities of the branches, passages made along the aisles between the trees just beneath the outer extremities of the branches thereof are most likely to intersect the greatest number of tunnels. Accordingly, as will be described herein, closed passages 12 are made in straight lines and in crisscross fashion just beneath the tips of the branches of the trees in which bait is deposited for attracting the rodents from their usual tunnels.

Figure 3:
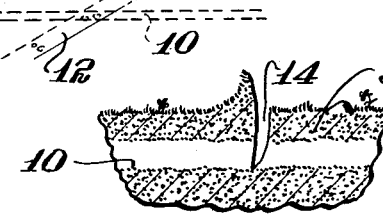
Fig. 3 is a vertical section transversely of a trench in its initial formation as made herein at an intersection with a rodent-made tunnel.

While it has heretofore been suggested to make open furrows or trenches between the rows of trees, this practice would have serious disadvantages; first, because the rodents are timid and will not expose themselves in the open trenches even for the sake of bait unless they are extremely hungry; second, because many State laws prohibit placing poison bait in open places where it is easily accessible to domestic animals and our harmless wild animals; and third, because any breach of the sod or soil, especially in hilly or rolling countries promotes soil erosion which can be extremely costly to repair. The primary purpose of the method herein is therefore to provide a satisfactory closed passage and this is accomplished by first making a continuous cut or incision which penetrates the sod to a depth of approximately two to three inches and then tilting the sod at one side of the incision, preferably at the side away from the trees, as shown in Fig. 3, to provide an open substantially V-shaped trench 14. During the process of tilting the sod the underside is operated upon to loosen some of the soil clinging to the sod roots so that it falls away to the bottom of the trench, and at the same time to stretch or attenuate the sod. While the sod is held elevated the bottom of the trench is operated on to enlarge it and to form a smooth, rounded, compacted bottom on which the bait will rest in a conspicuous position without being mixed with particles or lumps of soil. Immediately following the compacting or ironing operation the bait 18 is deposited at substantially uniformly spaced intervals along the compacted bottom of the trench whereupon the elevated portion of the sod is allowed to fall back across the trench to the position shown in Fig. 5. Because of the scraping off and loosening of the soil from the underside of the sod and compacting of the bottom of the trench, a substantially clear passage is left beneath the sod after it falls back. Moreover, because of the attenuation of the sod it does not settle back into its original position but has the lower part of its free edge portion contiguous to the upper part of the opposite edge portion of the trench, and is slightly elevated, thus minimizing any tendency of the sod to collapse into the underlying passage and thus block it.

It is of considerable importance in making the trench and passage to incise the sod cleanly without seriously disturbing it or pushing it laterally away from the trees as would occur in using a conventional plow share, since such a disturbance would inevitably force dirt into the intersecting rodent tunnels, thus blocking them and defeating the very purpose intended to be accomplished. Thus, it is important to cut cleanly through the sod rather than to tear it as with a plow and to hold it aloft continuously while operating upon the bottom of the trench. Furthermore, the operation on the bottom of the trench should be purely one of compacting and pressing as distinguished from gouging the bottom and sides so as to establish compactness and smoothness along the bottom and sides of the trench without blocking or otherwise impeding the intersecting ends of a rodent tunnel.

Figure 1:
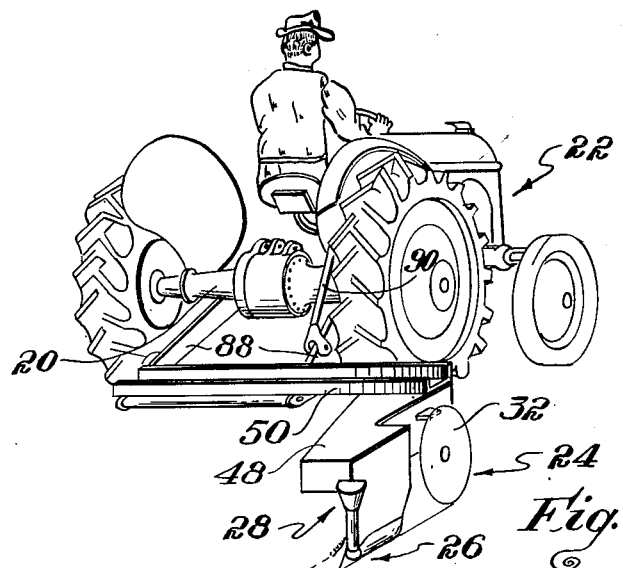
Fig. 1 is an isometric view showing an apparatus for carrying out the method, which apparatus forms the subject matter of aforesaid application Serial No. 386,940.

An apparatus for making these trenches and ultimately closed passages 12 is shown generally in Fig. 1, attached to the chassis 20 of a tractor 22 and comprises essentially as shown in Figs. 6 and 7 an incising member 24, an ironer 26 and bait feeding means 28. The incising member 24 has a circular cutting edge or blade 30 and is in the form of a concavo-convex disc 32 conventionally known as a coulter disc. The coulter disc is arranged to rotate in a vertical plane on a horizontally disposed axle 34, the latter being fixed in a bearing 36 which in turn is bolted to a frame iron 38, the latter being fastened to a channel iron 50. The axle 34 is inclined rearwardly so that the vertical plane in which the disc rotates toes outwardly in the direction of movement of the apparatus. An angle of about 15° is found to give the best results.

For best results the concave side of the coulter is faced inwardly with respect to the tractor, that is away from the trees although it can be operated in a reversed position, that is with the concave side facing outwardly. The disc has fast to it a hub 37 of smaller diameter. The peripheral surface of the hub has rolling contact with the surface of the sod over which the apparatus is traveling so that penetration of the cutting edge of the disc is limited by the difference in radii of the disc and hub. As the disc moves along it not only has rolling engagement with the ground but also a non-rotary upward and forward movement due to the outward toeing of its forward edge so that its rear edge skids along tilting the sod upwardly as shown in Fig. 3. The rotating concave surface of the disc has in addition to its tilting effect an abrading effect which loosens the soil clinging to the roots at the underside of the sod, detaching it and causing it to fall into the bottom of the trench. This frictional drag on the sod also attenuates it. In the absence of the hub 37 the upwardly moving inner surface of the disc would have a tendency to tilt the sod so high that it would tip over on its back and hence when it was later released it would not return to its initial position to cover the trench. The hub has therefore, in addition to its depth limiting feature, the added function of a guide or control surface which limits the upward movement of the sod so that it never reaches a point where it topples over. A scraper blade 39 is made fast to the frame iron 38 so as to have contact with the hub to scrape off soil which might cling to it.

Figure 4:
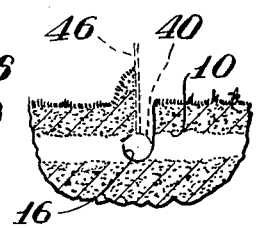
Fig. 4 is a corresponding section in an intermediate stage of making the passage.

The ironer 26 is an elongate solid cylinder 40 having a blunt, conical shape leading end or nose 42 (Fig. 7) and a tapering rear or trailing end 44. The lowermost surface of the ironer is generally convex and is tangent to a plane which is parallel to the axis of the shaft 34 and tangent to the lowermost point of the coulter disc. The nose 42 of the ironer is bluntly conical and hence will ordinarily move over or around obstacles that it meets head-on without stalling the apparatus. The tip of the ironer lies directly behind the coulter in a vertical plane which passes through the axis of the shaft 34 of the coulter. The ironer has a vertically rising flat plate or fin 46 made fast to the top thereof which extends upwardly and forwardly therefrom and is attached to a horizontal frame plate 48 made fast to the underside of the channel iron 50. The forward or leading edge 52 of the fin 46 lies close to the trailing edge of the disc and forwardly of the nose 42 of the ironer so as to make the gap between the trailing end of the coulter and the leading end of the ironer small and hence to effect a smooth continuous transfer of the elevated sod from the lateral surface of the disc as shown in Fig. 4, to the lateral surface of the fin 46. The leading edge of the fin below the center of rotation of the coulter disc has a rearwardly inclined edge portion 54, making an angle of approximately 60° with the longitudinal axis of the ironer to provide a clearance for the nose of the ironer. The inclined edge portion 54 continuously disperses grass and other debris as it is picked up by the forwardly moving edge of the fin so that it is not allowed to accumulate in any quantity so as to permit it to spread to the opposite sides of the ironer and to be wiped or pressed into the bottom and sides of the furrow together with the loose dirt as the ironer moves along the furrow.

The trailing edge of the fin 46 has attached to it a tube 56 which constitutes part of the feeding means 28 for delivering bait to the bottom of the trench in the wake of the ironer. The tube 56 has a lower end 58 which terminates substantially at the level of the longitudinal axis of the ironer so that its mouth is elevated from the bottom of the trench and an upper end which has associated therewith a funnel 60 to which bait may be supplied, either by hand or from a hopper containing a quantity of bait.

Figure 8:
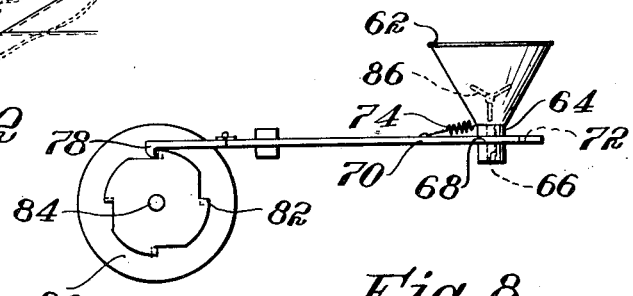
Fig. 8 is an elevation of a hopper feed.

Any conventional type of hopper may be employed, an example of which is shown in Fig. 8, as consisting of a vessel 62 of generally conical shape in which bait may be placed. The lower end of the vessel has a spout 64 through which there is a vertical passage 66. A laterally extending diametrical opening 68 is made through the walls of the spout so as to intersect the passage 66 for receiving a slide plate or bar 70 which has in it an opening 72 corresponding in diameter to the passage 66. A spring 74 attached to the slide and to the spout or some other part of the apparatus normally holds the plate in such a position that the hole 72 therein is out of alignment with the passage 66 thus blocking escape of bait from the hopper 60 to the tube 56. The plate 70 has connected to it a hinged latch 76 which has a depending tooth 78 adapted to engage one at a time one of a plurality of teeth 82 on the periphery of a disc 80. The disc 80 may be made fast to a shaft 84 which is operably connected to some moving part of the apparatus which effects rotation thereof during forward progress of the apparatus, thereby intermittently to move the plate 70 in a direction to align the hole 72 therein with the passage 66 and then to release the plate and allow it to return to its blocking position. The disc 80 may, for example, be attached to the hub of the coulter. Thus, bait is delivered at fixed intervals to the feed tube only during forward progress of the apparatus. There may also be an agitator 86 in the hopper 62 arranged to be rotated therein, for example, by connection to the shaft 84.

The channel iron 50 to which the operating components of the apparatus are fastened extends horizontally and laterally to one side of the tractor chassis so that as the tractor is driven along the aisles between rows of trees the apparatus will project just under the branches of the trees and with sufficient clearance so that the operator is clear of the branches and the forward progress of the tractor is not impeded. The channel iron 50 is preferably fastened to rearwardly extending arms 88—88 pivoted on the chassis of the tractor so that the entire unit may be elevated to an out of the way position during travel to and from the orchard and may be quickly lowered into operating position for use. A connecting rod 90 pivotally attached to one of the arms 88 and provided with a suitable mechanical leverage adjacent the drive wheel of the tractor affords means for lifting and lowering the unit.

The apparatus has distinct advantages in that the coulter disc as it encounters roots, stones, or other obstacles in the ground will roll over the obstacle or by them and will have no tendency to tear or lift the roots out of the ground as would a conventional plow share and makes a clean incision with the least disturbance or damage to intersecting rodent tunnels. The closely adjacent inclined leading edge of the fin rising from the ironer prevents the tilted sod from falling back into the trench before the ironing operation is started, continuously disperses trash so that it does not accumulate and the bluntly conical nose of the ironer readily passes by and over obstacles and smooths the walls of the trench without filling the entrances of the rodent tunnels with pieces of soil.

It should be understood that the present disclosure is for the purpose of illustration only and that this inven-

I claim:
1. A method of exterminating rodents in infested areas of earth containing matted roots comprising incising the earth, tilting the incised earth upwardly and laterally on one side only to form an open trench, operating upon the tilted earth to attenuate it and to loosen part of the soil so that it falls back into the trench, holding the attenuated earth elevated and operating upon the bottom and sides of the trench including the returned loose soil to pack it, distributing bait along the packed bottom and then allowing the attenuated earth to fall back over the trench upon the upper corner of the opposite edge of the trench thereby covering the trench.

2. A method of exterminating rodents in orchards comprising incising the sod along lines in the aisles between the trees, beneath the outstretched branches of each row of trees, tilting the incised sod upwarly and laterally on one side only to form an open trench, loosening the soil at the underside of the sod as it is tilted to cause a part of it to fall back into the trench, continuously compacting the bottom of the trench, including the loose soil returned thereto to form a hard packed bottom, distributing bait at intervals along the hard packed bottom and then releasing the sod so that it falls back over the open trench to cover the same.

3. A method of exterminating rodents in orchards comprising incising the sod along lines in the aisles between the trees, which will cross the outer part of the circle of normal root spread of the trees so as to intersect rodent-made tunnels which are most frequent at the root tips, tilting the incised sod upwardly and laterally on one side only to expose an open trench, loosening the soil at the underside of the sod as it is tilted to cause a portion of it to fall back into the trench and thereby contribute to attenuation of the sod, while said sod is held elevated, continuously compacting the bottom of the trench including the loose soil which falls back into the trench to form a smooth firm bottom, distributing bait at frequent intervals along said bottom and then releasing the elevated sod so that it falls back over the open trench upon the upper corner of the opposite edge thereof.

4. A method of exterminating rodents in orchards comprising incising the sod along lines in the aisles between the trees so as to intersect a maximum number of rodent-made tunnels, tilting the incised sod along one side only of the incision to form an open trench, controlling the elevation of the sod to prevent it from folding back on itself while it is being tilted, operating upon the tilted sod to attenuate it and thereby loosen part of the soil clinging to the exposed sod roots so that it falls back into the trench, holding the attenuated sod elevated and operating upon the bottom and sides of the trench including the loose soil at the bottom to pack it, distributing bait along the bottom and then allowing the attenuated sod to fall back over the trench against the opposite side thereof, thereby covering the trench.

5. A method of exterminating rodents in orchards comprising forming covered passageways beneath the surface of the ground at a level corresponding substantially to the normal depth of the rodent-made tunnels by incising the ground, loosening earth adjacent the incision and simultaneously tilting a portion of the earth only on one side of the incision, shaping the incision to have the characteristics of a tunnel formation and simultaneously packing the loose earth at the bottom of the tunnel during formation thereof, distributing bait at intervals along said tunnel, and intersecting one or more rodent-made tunnels while forming said first named tunnel.

References Cited in the file of this patent

UNITED STATES PATENTS

| 117,441 | Mettler | July 25, 1871 |
| 643,019 | Walton | Feb. 6, 1900 |
| 1,002,344 | Watson | Sept. 5, 1911 |
| 1,990,262 | Baily | Feb. 5, 1935 |
| 2,269,724 | Linkogel | Jan. 13, 1942 |
| 2,565,439 | Sears et al. | Aug. 21, 1951 |
| 2,598,121 | Hanibal | May 27, 1952 |

FOREIGN PATENTS

| 11,107 of 1933 | Australia | Nov. 17, 1933 |
| 13,555 of 1933 | Australia | July 20, 1934 |
| 391,347 | France | Aug. 27, 1908 |